Aug. 21, 1962 G. K. HURLBUT 3,050,108

DATA CARD INSERT-REMOVING PUNCH

Filed Feb. 2, 1960 3 Sheets-Sheet 1

GORDON K. HURLBUT *INVENTOR.*

BY [signature]

ATTORNEY

GORDON K. HURLBUT INVENTOR.

BY [signature]

ATTORNEY

Aug. 21, 1962 G. K. HURLBUT 3,050,108

DATA CARD INSERT-REMOVING PUNCH

Filed Feb. 2, 1960 3 Sheets-Sheet 3

GORDON K. HURLBUT *INVENTOR.*

*BY* Frederick E. Bartholy

ATTORNEY

United States Patent Office 3,050,108

Patented Aug. 21, 1962

3,050,108

DATA CARD INSERT-REMOVING PUNCH

Gordon K. Hurlbut, Chenango Bridge, N.Y., assignor to Porta-Trace, Inc., Binghamton, N.Y., a corporation of New York Filed Feb. 2, 1960, Ser. No. 6,328
10 Claims. (Cl. 156—584)

This invention relates to accessory apparatus in connection with the use of certain types of data processing cards and, more particularly, to a stripping device for removing the protective covering placed over the aperture of such cards.

Cards, in a certain format, with holes punched in them for electrical sorting and data processing machines, are widely used in office as well as industrial applications. Aside from carrying information in the form of strategically distributed punched holes, cetrain types also have a cutout or aperture to accommodate a picture which, in most cases, is in the form of a photographic film transparency. Mounting the film in the aperture of the card so that it serves as a support as well as a frame for the picture is not a simple matter inasmuch as the thickness of the card must be kept to close tolerances. The transparency must form a continuous surface with at least one side of the card so as not to impede its handling in the data processing machines.

A commercially widely used card has an aperture in the form of an oblong square larger than the film which it accommodates. A thin sheet of plastic material which has an aperture of the same configuration, but smaller than the film transparency, is glued over the card so that the two apertures are properly centered. Thus a border or ledge is formed by the plastic material, having an adhesive coating facing the other side of the card. In this manner, the card is prepared for the user to place a film transparency into the aperture and will be firmly held by the glued ledge. However, before the card can be shipped to the user, the plastic ledge, especially the adhesive surface thereof, must be protected. This is accomplished by placing a protective membrane in the form of a glassine sheet cut to the size of a film transparency in the aperture of the card and against the adhesive coated ledge. The user of the card must first remove the glassine sheet in order to seal in the picture transparency. This requires a time-consuming, manual operation often resulting in damage to the card.

It is, accordingly, the primary object of this invention to provide an apparatus which is capable of removing the glassine sheet from data processing cards without injuring the adhesive ledge.

It is a further object of the invention to provide an apparatus which performs the above stated function automatically by the mere pressing of a lever or actuation of a button by the user.

It is a particular feature of the invention that by virtue of the construction of the ejection member the glassine covering is quickly removed in one piece without leaving any torn portion on the card.

Other objects and features will be apparent from the following description of the invention, pointed out in particularity in the appended claims, and taken in connection with the accompanying drawing in which:

Figures 1, 2:
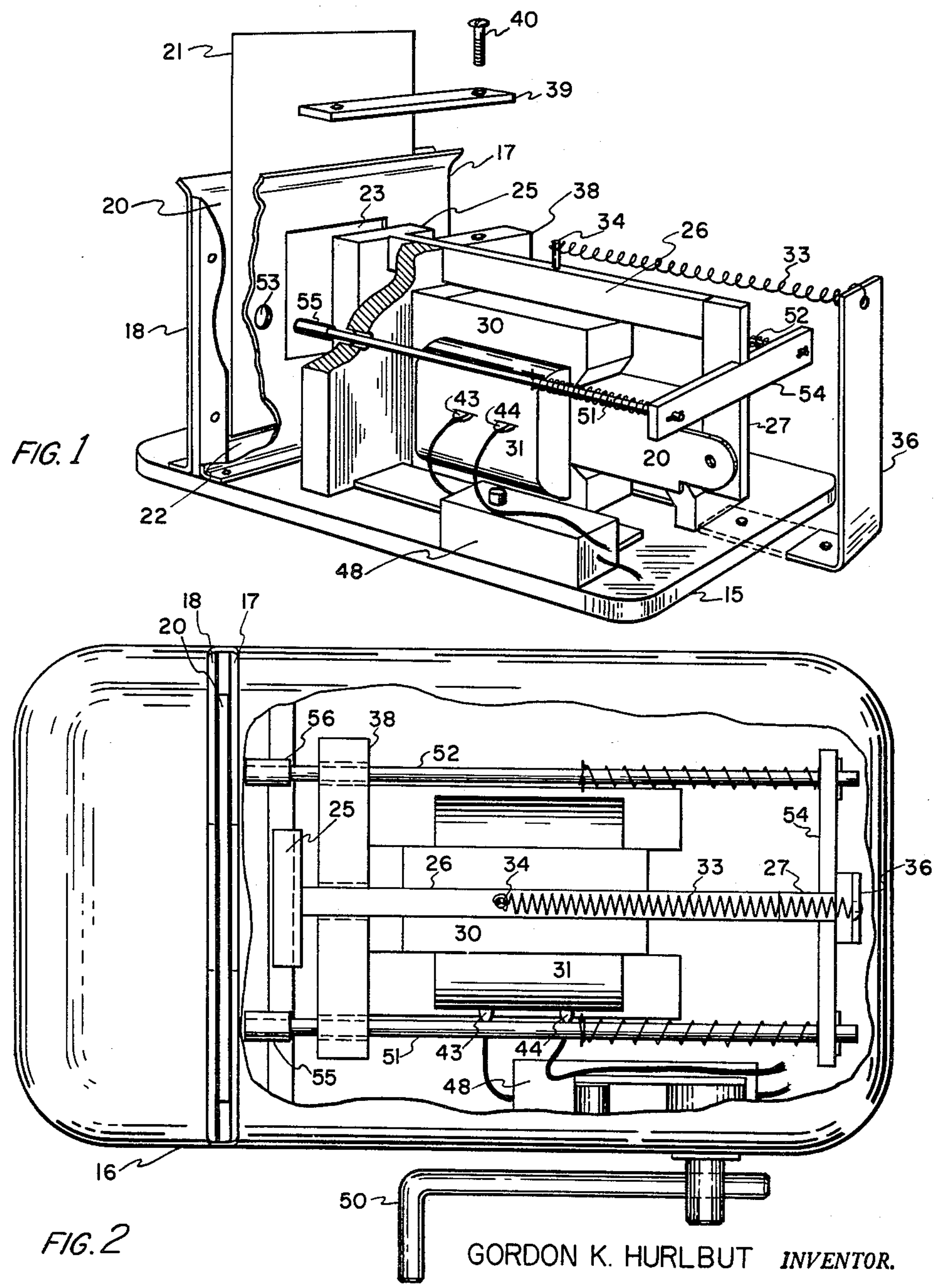
FIGURE 1 is a perspective view of the working components of the apparatus.
FIGURE 2 is a top view thereof.

Essentially, the apparatus, in accordance with the invention, is a power-operated punch of special construction, having an ejector head which by sudden impact against the glassine sheet removes it from the card. The latter is held against the wall of a receptacle having a cutout through which the head may pass, the cutout being in alignment with the aperture in the card.

The construction of the head plays an important part in the operation of the device. As will be seen from the following description of the constructional features shown in the drawings, the head carries a resilient impact element which first engages the glassine surface and applies a force perpendicular thereto. The resultant stress causes a certain amount of slippage of the glassine sheet over the adhesive coating. Following this, one or more piercing tips affixed to the head puncture the glassine and hold it in position on the head while it passes through the cutout.

Referring to the drawings, FIGURE 1 shows in a perspective view the component elements of the apparatus. The assembly is mounted on a baseboard 15 which may be metal or any suitable plastic material. As seen in FIGURE 2, a cover 16, fitting over the baseboard 15, forms a housing for the entire assembly.

Secured to the baseboard 15 and extending therefrom in a vertical direction are the plates 17 and 18. Placed face to face, at a given distance apart, they form a receptacle 20 which accommodates a data processing card 21. The plate 17 is partially cut away in this view to show that inside the receptacle 20 the card 21 rests on a cross member 22 which locates it at the proper height to have the aperture in the card line up with the cutout 23 in the plate 17. A corresponding cutout is provided for in the plate 18, which cannot be seen in this view.

Facing the cutout 23 is the ejection member, which comprises a head portion 25 and a shank portion 26 attached thereto. The latter forms an L-shaped bar, the downwardly extending leg 27 of which is attached to the plunger 29 of an electro-magnet having a core 30 around which is wound the coil 31. A retracting spring 33 is attached at one end to a pin 34 affixed to the shank 26, and at the other end to a stationary bracket 36 attached to the baseboard 15. (The bracket 36 in FIGURE 1 is shown in an exploded view away from the baseboard 15 so as to permit a clear view of the other components.)

The shank 26 is slidably mounted for reciprocating movement in a slot cut in the vertically extending wall 38 which is also attached to the baseboard 15. A cover plate 39 (shown in exploded view) is secured to the top of the wall 38 by suitable screws, one of which is shown designated by the reference character 40. In this manner, the shank 26 is held in the slot cut in the wall 38. Firm support for power operation of the ejection member is provided by the solid plunger 29, to which it is attached and by the wall 38 in which it has a sliding fit.

Terminals 43 and 44 of the coil 31 connect to a conventional electric cord through actuating switch 48 attached to the base plate 15. The switch 48 is so located that when the cover 16 is in place an operating handle 50 carried thereby will engage the actuating button of the switch 48.

The ejection member also carries means for holding the card 21 securely in position when the electro-magnet is actuated. This is accomplished by the rods 51 and 52 which are affixed to a cross bar 54 attached to the leg 27. The rods 51 and 52 are slidably supported in openings provided in the wall 38 and carry at their free end rubber tips 55 and 56, respectively. These tips enter the receptacle 20 through suitable openings 53 in the wall 17, thus engaging the card 21 and holding it securely against the wall 18. This will be more fully described in considering the operation of the device.

Figure 6:
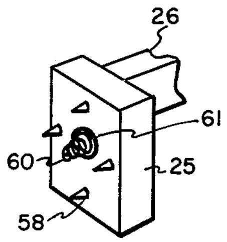
FIGURE 6 is a perspective view of the face of the ejector head showing one preferred embodiment.
Figure 7:
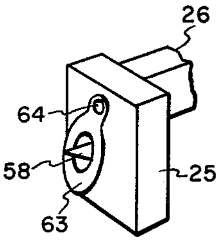
FIGURE 7 is a similar view showing a modification thereof.
Figure 8:
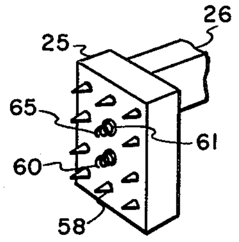
FIGURE 8 shows another modification of the face of the ejector head.

It has been mentioned that the construction of the head 25 of the ejection member is of importance for proper operation and for the fulfillment of the objects of the invention. Referring to FIGURES 6 to 8, there are shown several forms of head construction, the preferred form being that shown in FIGURE 6. This consists of a rectangular head 25 which is so dimensioned as to fit snugly in the cutout 23 of plate 17 and in the cutout of plate 18.

On the face of the head 25 and protruding therefrom are a plurality of conically-shaped pierce tips 58 and an impact element in the form of a coil spring 60. The latter is mounted simply in a circular recess 61 provided in the head 25.

The construction shown in FIGURE 6 consisting of four piercing members displaced around a centrally-located spring was found in practice to perform very satisfactorily. Various modifications may be made, of course, with the underlying idea in mind to apply a resilient impact force and to follow this up with one or more penetrating elements.

A simple modification is shown in FIGURE 7 where the face of the head 25 has a resilient lug 63 attached to it by means of a rivet 64. The lug 63 is bent outwardly and surrounds a centrally-located piercing spear or tip 58.

In certain applications where the glassine sheet is of very thin material which is likely to tear easily, the construction shown in FIGURE 8 may prove more efficient. There are two centrally-disposed spring impact elements 60 and 65 surrounded by ten uniformly distributed pierce tips 58.

Figure 9:
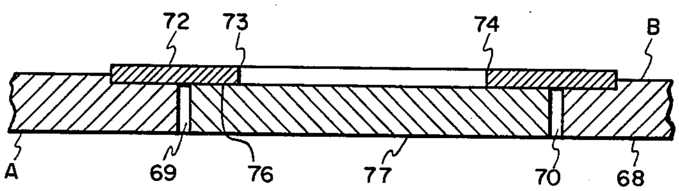
FIGURE 9 is an enlarged sectional view of the card with the glassine covering adhering thereto.

For a more complete understanding of the apparatus herein described, an enlarged view of the construction of the type of data processing card used in connection therewith is shown in FIGURE 9. The card stock 68 has an aperture cut therein indicated by the lines 69 and 70 which is of the proper size to accommodate the film transparency. The thickness of the card 68 is approximately the same as that of the film which is to be inserted therein so that when it is inserted in the aperture it will present a continuous surface at the side indicated by A. On the other side B of the card 68 is glued a sheet 72 of plastic material which is very thin in comparison with the thickness of the card stock. The sheet 72 has a cutout indicated by the lines 73 and 74 which is smaller in dimension than that of the card 68. In this manner a supporting frame is formed by the ledge 76 of the sheet 72, to which a coating of adhesive material is applied. The protective membrane 77 consisting of a piece of glassine cut to the size of the film transparency and of approximately the same thickness, is then inserted in the cutout 69—70 so as to protect the ledge 76 as well as the adhesive surface thereof. Cards of the above construction are described in U.S. Patents 2,511,859 and 2,512,106.

Referring to the operation, the stripping apparatus shown in FIGURE 1 is in rest position. The ejection member consisting of the shank portion 26 and the head portion 25 is retracted by the spring 33. A card 21 is inserted in the receptacle 20 in such position that the plastic sheet 72 (FIGURE 9), faces the ejection head 25. The opening 23 is thereby lined up with the cutout 73—74 of the plastic sheet 72. Upon actuation of the electromagnet, the plunger 29 will force the ejection member to move toward the cutout 23. Before the head 25 enters the cutout 23, the rods 51 move into the apertures 53 in the plate 17 so that the ends thereof equipped with the rubber tips 55 engage the card 21 and hold it firmly against the inner side of the wall 18. The card 21 is thus firmly held in the receptacle 20.

Figure 3:
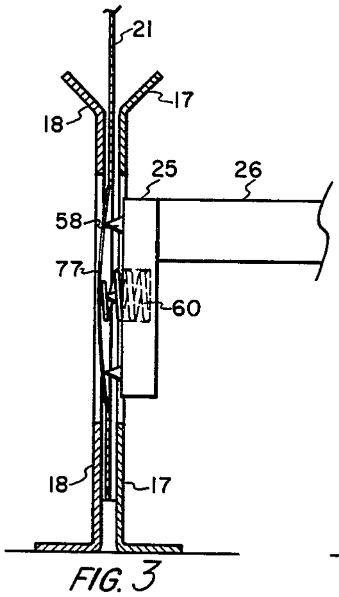
FIGURE 3 is a schematic sectional view of the operation of the ejector head in contact position.
Figure 4:
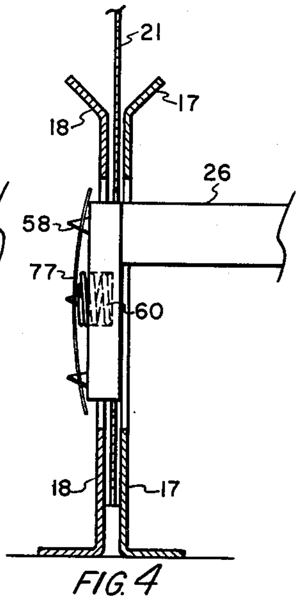
FIGURE 4 is a similar view showing the head penetrating the opening in the card.
Figure 5:
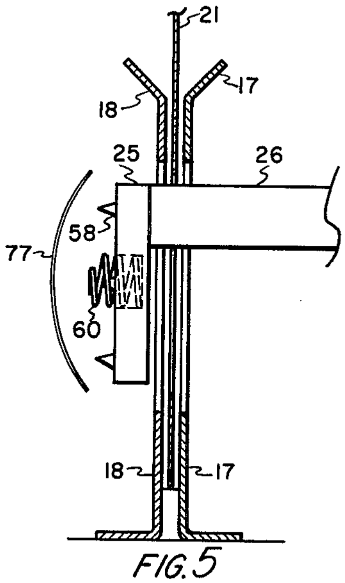
FIGURE 5 is a similar view depicting the release of the glassine covering and the ejector head in a position about to be retracted.

The action of the stripping head 25 is shown in FIGURES 3, 4, and 5. As the head 25 enters the cutout in the plate 17 (FIGURE 3), the resilient impact element, i.e., the spring 60, engages the glassine sheet 77, causing a slight bending thereof in the middle. This is followed up with the pierce tips 58 which penetrate the glassine sheet 77.

In FIGURE 4, the head 25 is shown in the position of complete excursion, the glassine 77 being stripped from the card 21 and held by the pierce tips 58.

As soon as the head is retracted by the spring 33 (upon opening of the switch 48) the force due to the impact of the head 25 against the glassine covering 77 is removed. This is illustrated in FIGURE 5. The spring 60 may now expand and the glassine 77 is thereby stripped from the head 25.

While the apparatus shown in FIGURES 1 and 2 utilizing a solenoid power ejection member is preferable, particularly where a large number of cards must be stripped, a hand-operated device of simple construction may also be useful. Such a construction, in accordance with this invention, is presented in FIGURES 10 and 11.

The elemental parts are the same as in the embodiment described in connection with FIGURES 1 and 2, consequently, for the sake of conciseness, only parts of different construction are shown. The cover 15 as well as the card retaining rods 51 are omitted since these remain unchanged. The ejection member consisting of the head 25 and the L-shaped shank 26 are similar in construction except that the shank 26 is recessed as indicated by reference character 80. Two vertically extending blocks 81 and 82 are mounted on the baseboard 15 for the support of the ejection member. Each of these blocks is provided with a slot 83 and 84, respectively, in which the shank 26 is slidably supported. The slots extend in the vertical direction to permit, aside from horizontal movement, a certain amount of vertical displacement also of the shank 26. A retracting spring 33 is placed between a pin 34 affixed to the shank 26 and a pin 86 attached to the block 82. A hand operated lever 88 is pivoted in the support 89 mounted on the baseboard 15. The lever 88 has a cam extension 90 which engages a wedge piece 91 slidably supported in guide blocks 93 and 94 attached to the baseboard 15. A retracting spring 96, placed between a stud 97 secured to the guide block 94 and to the pin 98 affixed to the underside of the wedgepiece 91, maintains the latter in rest position.

Midway of the lever 88 is an eyelet drilled therein is hooked the end of the power spring 100, the other end being similarly hooked in an eyelet provided in the leg 27.

Figures 10, 11:
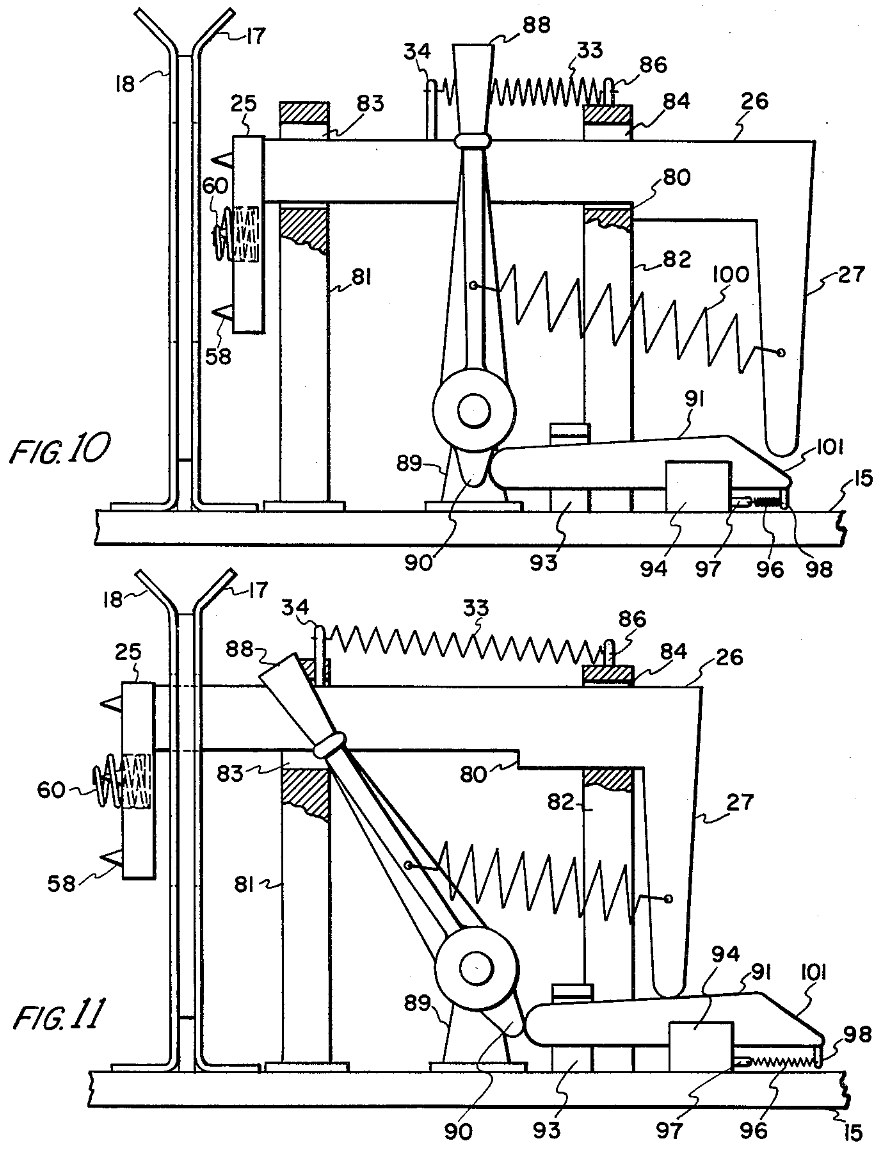
FIGURE 10 is a schematic side elevational view of a modified form of the apparatus in rest position.
FIGURE 11 is a similar view showing it in actuated position.

The stripping device is shown in rest position in FIGURE 10, the lever 88 being in a substantially vertical position and the ejection member retracted. The shank 26, by virtue of its recessed portion is held against the wall of the block 82, forming thereby a latch. As the lever 88 is depressed, the spring 100 becomes tensioned, but the ejection member is prevented from horizontal displacement by virtue of the above described latching position. Further movement of the lever 88 thus produces greater tension on the spring 100 until the cam 90 displaces the wedge piece 91. The latter has a sloping surface 101, which engages the toe portion of the leg 27 causing the latter to be lifted until the latching between the recessed portion and the block 82 is released. The ejection member is thus freed and moves suddenly in the direction toward the cutout 23 until the power stored in the spring 100 is expended.

The released position is shown in FIGURE 11. The lever 88 is still depressed but the spring 100 is no longer tensioned. The retracting spring 33 which was tensioned by the movement of the ejection member is now free to exert its force and cause partial retraction of the head 25, the glassine being stripped from its surface by the spring 60. When the lever 88 is returned into its original position, the spring 33 will further retract the shank 26 until it falls again into the latching position as seen in FIGURE 10. When the lever 88 is in the vertical position the wedge piece 91 is disengaged, being returned into rest position by its retracting spring 96.

I claim:

1. Apparatus for the removal of the protective membrane covering the aperture of data processing cards comprising a receptacle accommodating a card, said receptacle having walls defining an opening in alignment with the aperture in said card, an ejection member adapted to enter said opening and consisting of a membrane engaging head portion having at least one pierce tip and a resilient impact element on the leading surface thereof, said head portion being formed to follow the outline of said opening and to fit snugly therein, and a shank portion, means for supporting said shank portion for reciprocating movement, means for retaining said ejection member away from said opening thereby allowing insertion of said card into said receptacle, and power means for causing rapid entry of said ejection member into said opening.

2. Apparatus for the removal of the protective membrane covering the aperture of data processing cards comprising a receptacle accommodating a card, said receptacle having walls defining an opening in alignment with the aperture in said card, an ejection member adapted to enter said opening and consisting of a membrane engaging head portion having at least one pierce tip and a resilient impact element on the leading surface thereof, said head portion being formed to follow the outline of said opening and to fit snugly therein, and a shank portion, means for supporting said shank portion for reciprocating movement, means for retaining said ejection member away from said opening thereby allowing insertion of said card into said receptacle, and power means for causing rapid movement of said member into said opening and pressure means for holding said card against one wall of said receptacle prior to entry of said head portion into said opening.

3. Apparatus in accordance with claim 1 wherein said resilient impact element is a coil spring extending from the leading surface of said head portion in the direction axial to said shank.

4. Apparatus in accordance with claim 1 wherein said resilient impact element comprises an annular lug of spring material attached to the leading surface of said head portion and bent outwardly therefrom, said lug surrounding a piercing member in the form of a conical tip attached to said surface.

5. Apparatus in accordance with claim 1 wherein a plurality of piercing members comprise conical pins distributed on the leading surface of said head portion.

6. Apparatus in accordance with claim 1 wherein said power means comprise a solenoid electromagnet having a plunger and a coil, and said shank portion being an L-shaped bar, and said means for supporting said shank portion comprising a frame housing said coil, said frame having a slot in which the horizontal portion of said bar is adapted to slide, said plunger being attached to the vertical portion of said bar.

7. Apparatus in accordance with claim 2 wherein said pressure means comprise at least one rod having a tip of resilient material, the inner wall of said receptacle having an opening through which said tip is adapted to enter, said rod being slidably supported in a frame carried by said shank portion.

8. Apparatus for the removal of the protective membrane covering the aperture of data processing cards, comprising a receptacle having walls defining an opening in alignment with the aperture of said card, an ejection member consisting of a head portion adapted to enter said opening and to fit snugly therein, and a shank portion attached to said head, means for slidably supporting said shank portion for reciprocating movement, latch means for holding said ejection member in rest position away from said opening, thereby allowing insertion of said card into said receptacle, power means for causing rapid movement of said member into said opening comprising a manually operable lever, a spring between said lever and said shank portion adapted to be tensioned upon movement of said lever, latch release means operable upon a predetermined position of said lever permitting actuation of said member and means for partially retracting said member upon release of the tension on said spring.

9. Apparatus for the removal of the protective membrane covering the aperture of data processing cards, comprising a receptacle having walls defining an opening in alignment with the aperture of said card, an ejection member consisting of a head portion adapted to enter said opening and to fit snugly therein, and a shank portion attached to said head, said shank portion consisting of an L-shaped bar having a downwardly extending leg, means for slidably supporting said bar for reciprocating movement, latch means for holding said ejection member in rest position away from said opening, thereby allowing insertion of said card into said receptacle, power means for causing rapid movement of said member into said opening comprising a manually operable lever, a spring between said lever and said leg adapted to be tensioned upon movement of said lever, latch release means operable upon a predetermined position of said lever permitting actuation of said member and means for partially retracting said member upon release of the tension on said spring.

10. Apparatus in accordance with claim 9 wherein said means for slidably supporting said bar comprises a pair of blocks extending vertically from a base, each having a slot accommodating said bar for sliding movement in a horizontal direction and for restricted movement in a vertical direction, said latch means being formed by a recessed wall of said bar engaging a ledge of one of said slot and said release means including a wedge engaging the leg of said bar causing vertical movement thereof, thereby disengaging said wall from said ledge.

References Cited in the file of this patent

UNITED STATES PATENTS

| | | |
|---|---|---|
| 2,414,937 | Eliott | Jan. 28, 1947 |
| 2,493,159 | Morrison | Jan. 3, 1950 |
| 2,560,301 | Morrison | July 10, 1951 |